United States Patent [19]  [11]  4,123,398
Unrau et al.                        [45]  Oct. 31, 1978

[54] FLAME RESISTANT CELLULOSIC PRODUCT CONTAINING ANTIMONY PENTOXIDE AND POLYVINYL BROMIDE

[75] Inventors: David G. Unrau, Budd Lake; Norman A. Portnoy, Hopatcong; Peter J. Hartmann, Dover, all of N.J.

[73] Assignee: International Telephone and Telegraph Corporation, New York, N.Y.

[21] Appl. No.: 800,186

[22] Filed: May 25, 1977

[51] Int. Cl.² .......................... C08L 1/24; D01F 2/06
[52] U.S. Cl. ....................... 260/17.4 CL; 264/176 F; 264/188; 264/191
[58] Field of Search ............ 260/17.4 CL; 264/176 F, 264/188, 191

[56] References Cited

U.S. PATENT DOCUMENTS 3,960,989  1/1976  Petrow .................................. 260/884

FOREIGN PATENT DOCUMENTS 1,323,689  7/1973  United Kingdom ................. 264/191 F Primary Examiner—Edward M. Woodberry
Attorney, Agent, or Firm—J. B. Raden; H. J. Holt

[57] ABSTRACT

A regenerated cellulosic product is made flame resistant by the addition to the cellulosic solution from which the product is regenerated of from 3 to 7% by weight of colloidal antimony pentoxide and from 5 to 30% by weight of polyvinyl bromide.

10 Claims, No Drawings

FLAME RESISTANT CELLULOSIC PRODUCT CONTAINING ANTIMONY PENTOXIDE AND POLYVINYL BROMIDE

This invention relates to a flame resistant regenerated cellulosic product and to a process for its preparation.

Flame retardancy has been imparted to cellulosic fibers, films or other cellulosic shapes by a large variety of known techniques and compositions. Compositions containing phosphorus, nitrogen, borates, antimony and halogen compounds have been used either alone or in combination by addition to the spinning solutions from which the products are regenerated or by post treatment of the regenerated products. While many such flame retardant systems achieve adequate levels of flame retardancy, they encounter other problems which reduce or defeat their usefulness. Other product properties are adversely affected, repeated washings reduce their effectiveness for flame retardancy or the additives produce product discoloration. More recently, severe environmental or health hazards have been uncovered in the use of otherwise effective flame retardant additives.

The unique action of antimony oxide-halogen systems has been discussed in the literature. Antimony oxide alone does not give flame resistant cellulosic products. Halogenated compounds impart flame resistance but at relatively high levels. It is hypothesized that a reaction product forms between antimony oxide and halogen compounds which is active in both the solid and vapor phase. Nylon or polyester fibers require a flame retarding agent which is active mainly in the vapor phase; cellulose, by contrast, normally requires flame retarding agents which act in both the solid and vapor phase. The use of antimony oxide-halogen systems for imparting flame retardancy is disclosed, for example, in U.S. Pat. Nos. 3,575,898 and 3,960,989. In the former patent, antimony oxide and a vinyl or vinylidene chloride polymer or copolymer is added to a cuprammonium solution from which fibers are spun. In U.S. Pat. No. 3,960,989, colloidal antimony oxide and polyvinyl chloride or polyvinylidene chloride are suggested for use in emulsion or film form as a post treatment for imparting flame retardancy to paper or fabrics. Antimony oxide, however, is known to react with the sulfur compounds in viscose solutions and has not therefore been added to viscose solutions from which cellulosic products are regenerated.

It is accordingly a primary object of the present invention to provide a cellulosic product which combines a high degree of flame resistance with acceptable product properties, which retains its flame resistance after repeated washings or dry cleanings and which does not present environmental or health problems.

It is an additional object of this invention to provide a process for imparting flame resistance to a regenerated cellulosic product by addition of a flame retardant additive to the cellulosic solution from which the product is regenerated, which additive is compatible and not reactive with the cellulosic solution.

The foregoing and other objects of the invention are achieved by the addition to the cellulosic solution of from 3 to 7% by weight of colloidal antimony pentoxide and from 5 to 30% by weight of polyvinyl bromide. The invention is specific to both colloidal antimony pentoxide and polyvinyl bromide. Many other halogen sources, both chloride and bromide, are known but none give an adequate level of flame resistance in combination with antimony pentoxide, i.e., self-extinguishing products, even where used at equivalent or higher levels than polyvinyl bromide. Polyvinyl chloride, polyvinylidene chloride and copolymer latexes of these two polymers are not stable in viscose and thus cannot be used. In the case of the antimony source, it has been found that colloidal antimony pentoxides ($Sb_2O_5$), unlike other antimony oxides such as $Sb_2O_3$, does not interact with viscose solutions. Other antimony oxides, such as $Sb_2O_3$ or even $Sb_2O_5$ in non-colloidal form, produce a reaction product which gels the viscose and may discolor the regenerated end-product. The gel makes it impossible to spin into fibers. Other antimony based compositions do not gel the viscose but the levels of flame resistance are inadequate at acceptable levels of addition. A mixture of colloidal antimony pentoxide and polyvinyl bromide in the proportions herein set forth is sufficiently stable to viscose and viscose processing to be retained in the finished fiber, to provide a high level of flame retardance and to produce a product of acceptable commercial properties. Moreover, because the flame retardant acts in both the solid and vapor phases, rayon fibers produced in accordance with the invention can be used in flame resistant blends with other synthetics such as polyester and nylon.

The following examples illustrate the practice of the invention. Unless otherwise indicated, all parts and percentages are by weight.

EXAMPLES 1-11

In these examples, a series of cellulosic films were prepared containing colloidal antimony pentoxide and one of each of a number of commercially available halogen containing flame retardant compounds. All samples contained 5% colloidal $Sb_2O_5$ and 30% of the halogen compound, based on cellulose. The films were prepared as follows:

A sample of filtered viscose containing 7.5 parts cellulose and 7.5 parts NaOH per 100 parts viscose and 30 parts $CS_2$ per 100 parts cellulose was used. This was mixed with 5 parts per hundred colloidal antimony oxide ($Sb_2O_5$) for two hours at 10° C. and ripened overnight at 24° C. This viscose was divided into 100 g. portions and a series of halogen containing flame retardant additives were mixed at a level of 30 parts of flame retardant per 100 parts of cellulose. The oily or liquid flame retardants were added without a carrier but solid materials were added in the minimum weight of a solvent such as dioxane, methylene chloride or the like required for dissolution. These compositions were stirred well and formed into films of 50 g. each by drawing to a thickness of 0.051 cm. on a 38 × 25 × 0.7 cm glass plate and cast into a coagulating-regenerating bath of 116 g/l $H_2SO_4$, 116 g/l $ZnSO_4$ and 234 g/l $Na_2SO_4$ at 25° C. The regenerated cellulosic films were washed with tap water and processed by the following treatment: 2 minutes in a solution of 2.5 g/l $H_2SO_4$ at 85° C. followed by a water wash; 5 minutes in a solution of 5.0 g/l $Na_2S$ and 3.3 g/l NaOH at 45° C. followed by a water wash; 3 minutes in an aqueous solution of 2.5 g/l $H_2SO_4$ at 45° C. They were then air dried.

Each of the films were then subjected to a flammability test. For the flammability tests, a Bunsen burner was adjusted to give a 7-8 cm. flame. Each film, about 7 × 10 cm was held in the flame for 3 or 12 seconds. After removal from the flame, the extent of burning was observed and evaluated. If the films self-extinguished within 0–4 seconds after removal from the flame, they were considered to be flame resistant. In the following table, the halogen compounds used in each sample are identified by either chemical name, or if unknown, by type of compound and trade designation or trademark, together with the percentage of halogen contained in the respective compounds.

TABLE I

| Ex. | Halogen Compound | % Cl or Br | Burning* Behavior |
|---|---|---|---|
| 1. | Tetrabromobisphenol A(TBBPA) | 74.4% Br | b.c. |
| 2. | TBBPA-bisdibromopropyl ether | 76.2% Br | b.c. |
| 3. | TBBPA-bis alkyl ether | 68.1% Br | b.c. |
| 4. | 2,4 dimethyl chlorendate | 51.3% Cl | b.c. |
| 5. | Mixed halogenated hydrocarbon (Douse 499) | 32.1% Br, 47.8% Cl | b.c. |
| 6. | Chlorinated paraffin (Kloro 6500) | 65% Cl | b.c. |
| 7. | emulsifiable chlorinated paraffin (ECP 6001) | 55% Cl | b.c. |
| 8. | emulsifiable brominated paraffin (Kromine 4515) | 15.2% Br | b.c. |
| 9. | emulsifiable chlorinated paraffin (ECP 425) | 50% cl | b.c. |
| 10. | chlorinated organophosphorus | 26% Cl, | b.c. |
| 11. | Poly (vinyl bromide) (PVBr) | 73% Br | s.e. |

*b.c. - burned completely; s.e. - self-extinguishing.

EXAMPLES 12–25

A series of additional films were prepared as set forth in Examples 1–11 containing varying proportions of polyvinyl bromide either alone, as a copolymer with polyvinyl chloride (PVC) or in admixture with another halogen compound. All samples contained 5% colloidal $Sb_2O_5$. The samples were again tested as in the prior examples. The results are set forth in Table II. The "% on Cellulose" is percentage by weight based on cellulose weight of total halogen compounds added to the viscose.

TABLE II

| Example | Halogen Compound(s) | % on Cellulose | Burning[1] Behavior |
|---|---|---|---|
| 12. | PVBr | 5 | Burned with difficulty |
| 13. | PVBr | 10 | s.e.; 3 sec. a.f.; a.g. |
| 14. | PVBr | 20 | s.e.; 2 sec. a.f.; a.g. |
| 15. | PVBr-PVC copolymer | 10 | b.c. |
| 16. | PVBr-PVC copolymer | 20 | s.e.; 4 sec. a.f.; a.g. |
| 17. | Fyrol 32B | 5 | b.c. |
| 18. | Fyrol 32B | 10 | b.c. |
| 19. | Fyrol 32B | 20 | b.c. |
| 20. | Hexa(2,3 dibromopropoxy) phosphazene | 10 | b.c. |
| 21. | Hexa(2,3 dibromopropoxy) phosphazene | 20 | b.c. |
| 22. | PVBr (5%) Fyrol 32B[2](5%) | 10 | b.c. |
| 23. | PVBr (8%) Fyrol 32B(5%) | 13 | s.e.; 2 sec. a.f.; no a.g. |
| 24. | PVBr (5%) Fyrol 32B(10%) | 15 | s.e.; 2 sec. a.f.; no a.g. |
| 25. | PVBr (8%) Fyrol 32B(10%) | 18 | s.e.; 2 sec. a.f.; no a.g. |

[1] a.f. - after flame; a.g. - after-glow.
[2] Fyrol 32B is a trademark for tris(2,3 dibromopropyl)phosphate.

EXAMPLES 26

The following example shows the preparation of a rayon viscose fiber containing no fire retardant additive. A viscose was prepared from a cold caustic extracted, sulfate processed south-eastern pine wood-pulp to contain 7.5 parts of cellulose, 7.5 parts of NaOH per 100 parts viscose and 30 parts of $CS_2$, 1.3 parts of DMA and 1.3 parts of carbowax 1540 per 100 parts of cellulose. After filtration, deaeration and ripening at 22° C. for 16 hours, the viscose was spun on a bench scale spinning unit under the following conditions:
  Primary bath: specific gravity 1.242, $H_2SO_4$(g/l) 62.2, $ZnSO_4$ (g/l) 39.4, $Na_2SO_4$ (g/l) 210.0, Temp. ° C. 40, Travel, cm. 76.2
  Secondary bath: $H_2SO_4$ (g/l) 24, Temp. ° C. 95
A 400 hole × 128 micron spinnerette was used with a pump delivery of 51.5 g/minute. After collection and cutting into 3.8 cm. staple, the samples were hand processed by the following treatment: 2 minutes $H_2SO_4$ at a concentration of 0.25 parts per 100 parts of solution at 85° C. followed by a water wash; 5 minutes in aqueous $Na_2S$/NaOH at a concentration of 5.0 parts $Na_2S$ and 3.3 parts NaOH per 100 parts solution at 45° C. followed by a water wash; 3 minutes in $H_2SO_4$ at 0.25 parts $H_2SO_4$ per 100 parts solution at 45° C. and then washed well with water and finished with 0.3 parts/100 parts solution of RSF-15. They were then air dried. The fiber properties are shown in Table III.

When the fibers resulting from the procedure of this example were twisted into a loose yarn ¾–1 cm. in diameter and this yarn was ignited for 3 seconds with a 7–8 cm. Bunsen burner flame, it burned rapidly and completely. With these samples it was not necessary to contact the flame to the cellulose yarn for longer than a fraction of a second.

EXAMPLE 27

The procedure of Example 26 was followed except that 12.8 parts of colloidal $Sb_2O_5$ and 15.9 parts of PVBr latex were added to 1700 parts of viscose and mixed at 10° C. for 90 minutes. The % of $Sb_2O_5$ and of PVBr were each 5%, based on cellulose. The physical properties of fibers resulting from fibers produced by the procedure of this example are also listed in Table III. When these fibers were twisted into a loose yarn of ¾–1 cm. diameter and ignited for 3 seconds with a 7–8 cm. Bunsen burner flame, the yarn burned erratically and self-extinguished about 12 seconds after removal from the flame. These fibers contained 1.70% Sb and 3.27% Br.

EXAMPLE 28

The procedure of Example 26 was followed except that 13.9 parts of colloidal $Sb_2O_5$ and 33.8 parts of PVBr latex were added to 1800 parts of viscose (5% $Sb_2O_5$, 10% PVBr). Fiber physical properties are listed in Table III. When these fibers were twisted into a loose yarn of ¾–1 cm. in diameter and ignited for 3 seconds, the yarn self-extinguished within 2 seconds after removal from the flame. These fibers contained 2.22% Sb and 6.18% Br.

EXAMPLE 29

The procedure of Example 26 was followed except that 12.8 parts of colloidal $Sb_2O_5$ and 50.6 parts of PVBr latex was added to 1700 parts of viscose (5% $Sb_2O_5$, 15% PVBr). Fiber properties are listed in Table III. The burning behavior of these fibers was identical to those resulting from the procedure of Example 28. These fibers contained 2.23% Sb and 8.82% Br.

Table III compares the physical properties of the fibers spun from viscose solutions in accordance with Examples 26–29.

TABLE III

| Fiber from Ex. No. | Tenacity (g/d) Cond. | Wet | Elongation (%) Cond. | Wet | Wet Tenacity at 5% elongation (g/d) | denier |
|---|---|---|---|---|---|---|
| 26 | 2.41 | 1.63 | 10.80 | 16.50 | 0.43 | 4.10 |
| 27 | 2.00 | 1.16 | 7.60 | 14.88 | 0.32 | 3.45 |
| 28 | 2.48 | 1.65 | 9.07 | 12.16 | 0.46 | 3.89 |
| 29 | 1.97 | 1.02 | 8.23 | 12.88 | 0.36 | 3.34 |

Many compositions are effective flame retardants for cellulose but their flame retardance is of little value because of their inability to withstand repeated washings or dry cleanings. The following Example 30 demonstrates that repeated laundering does not substantially reduce the flame retardant properties of the present products while Example 31 shows equivalent results for dry cleaning.

EXAMPLE 30

The fibers of examples 28 and 29 were boiled with an eighty fold excess of a solution of 5.0 g/l $Na_3PO_4$ and 1.0 g/l Triton X-100 (trademark for commercially available nonionic surface active agent) for 4 hours. They were isolated, washed with water, and dried at 100° C. for one hour. This treatment is recognized by the fiber and textile industry as equivalent to 50 cycles of home laundering. (See W. F. McSherry et al, Am. Dyestuff Reporter, page 52, July, 1974). After this treatment, the fibers from Example 28 contained 2.04% Sb and 6.08% Br and the fibers from Example 29 contained 2.21% Sb and 8.65% Br. Both sets of fibers still exhibited rapid self-extinguishing properties after removal from an ignition source.

EXAMPLE 31

The fibers of Examples 28 and 29 were treated with commercial dry cleaning solvent containing a commercial dry-cleaning detergent by soaking about 1.2 g. of fiber with 75–100 ml. of this solution (1 g.detergent, per 75–100 ml. solvent) for 1 hour at room temperature. The fibers were collected by suction filtration and air dried at room temperature. Prior to this treatment, each set of fibers had been bleached to whiteness with a solution of 3 parts $H_2O_2$ per 100 parts of solution using about 100 mls. of this bleaching solution per 1g. of fiber. They were then isolated, water washed, dewatered by acetone rinsing and air dried before the dry cleaning experiment. Following these treatments the fibers of Example 28 contained 2.02% Sb and 5.64% Br and the fibers from Example 29 contained 2.01% Sb and 8.39% Br.

A semi-quantitative test was developed for measuring and comparing the degree of flame resistance. This was done by pressing a 6–8 cm. diameter flat circle of the fiber being tested and exposing this disk, after weighing, to a 7 cm. Bunsen burner flame for 3 seconds. The sample was allowed to burn unrestrained and then weighed after it extinguished. The degree of flammability was taken as proportional to the amount of weight lost on burning. Table IV shows the fiber weight loss in accordance with this test for Examples 26–31.

TABLE IV

| Example | % $Sb_2O_5$ in viscose | % PVB in viscose | Special Conditions | % of Initial Wt. Lost |
|---|---|---|---|---|
| 26 | 0 | 0 | | 98.8 |
| 27 | 5 | 5 | | 49.6 |
| 28 | 5 | 10 | | 31.4 |
| 29 | 5 | 15 | | 24.7 |
| 30 | ( 5 | 10 | simulated 50 cycle home laundering | 41.8 |
| 30 | ( 5 | 15 | simulated 50 cycle home laundering | 27.6 |
| 31 | 5 | 15 | 3% $H_2O_2$ bleaching followed by simulated dry cleaning | 23.0 |

In the past it has been very difficult for pure cellulosics to pass the Children's Sleepwear Standard 0-6X(F-F3-71)* without excessively large amounts of flame retardants. The standard allows an average char length of less than 17.8 cm. for 5 samples which have been laundered 50 times and dried at 105° C. for 30 minutes. Examples 32–36 deal with this Standard.

*Consumer Product Safety Commission - Flammable Fabrics Act-Federal Register, Vol. 40, No. 250, Section 1615.3, p.v. 59903, Dec. 30, 1975.

EXAMPLE 32

A viscose sample prepared as in Example 26, was spun into continuous filament rayon using a 150 hole × 51 micron hole spinnerette. The bath travel was 75 cm. and the bath was composed of 67 g/l $H_2SO_4$, 195 g/l $Na_2SO_4$ and 35 g/l $ZnSO_4$ so that the bath had a specific gravity of 1.23. The bath temperature was 47° C. and spinning speed was 31 m./minute. A stretch level of 47% was maintained on the fiber tow. The 150 filament tow received 1.3 turns of twist and was 265 denier or 1.8 denier per filament. The tow was finished in a 7 g/l emulsion of finishing oil. It was then wound on a bobbin and knitted into socks of 165 g/$m^2$ construction for flammability testing. After scouring as described in Example 30, the five test samples were oven dried at 105° C. for 30 minutes immediately prior to testing by the Standard for the Flammability of Children's Sleepwear 0-6X(FF3-71). All samples burned rapidly and completely when the ignition source was removed.

EXAMPLE 33

The procedure of Example 32 was followed except that 22.5 parts of colloidal $Sb_2O_5$ and 57.5 parts of PVBr latex were added to 3000 parts of viscose (5% $Sb_2O_5$, 10% PVBr) and stirred at 10° C. for 90 minutes, filtered, deaerated and ripened at 22° C. for 16 hours. Knitted socks prepared from those yarns contained 2.12% Sb and 5.85 Br after scouring and passed the FF3-71 Standard with an average char length of 6.9 cm. and a range of 5.3–7.9 cm for the five test samples. This is well within the 17.8 cm char length allowable by the Standard.

EXAMPLE 34

The procedure of Example 33 was followed except that 16.3 parts of colloidal $Sb_2O_5$ and 32.6 parts of PVBr latex were added to 1715 parts of viscose (5% $Sb_2O_5$, 8% PVBr). The regenerating-coagulating bath contained 73 g/l $H_2SO_4$, 239 g/l $Na_2SO_4$ and 56.6 g/l $ZnSO_4$ and had a specific gravity of 1.296. The bath temperature was 50° C. In addition the viscose used in this example contained 9.5 parts of cellulose, 6.2 parts of NaOH and 29.3 parts of $CS_2$ per 100 parts of viscose. The cellulose was sulfite processed western hemlock. The rayon produced by the procedure of this example contained 1.91% Sb and 4.89% Br. The knitted articles resulting from this process weighed 217 g/$m^2$ and self-extinguished when ignited by a 7-8 cm. Bunsen burner flame for 3 seconds.

EXAMPLE 35

The procedure of Example 32 was followed except that 38.5 parts of PVBr latex and 12.3 parts of colloidal $Sb_2O_5$ were added to 2050 parts of viscose (4% $Sb_2O_5$, 10% PVBr). The spinning bath, which had a specific gravity of 1.241 contained 88.2 g/l $H_2SO_4$, 186 g/l $Na_2SO_4$ and 42.6 g/l $ZnSO_4$ and was maintained at 35° C. throughout the experiment. The rayon produced by the procedure of this example contained 1.51% and 5.88% Br. The knitted articles self-extinguished and had an average char length of 14.0 cm. for duplicate samples.

EXAMPLE 36

The procedure of Example 32 was followed except that 35.0 parts of PVBr latex and 8.61 parts of colloidal $Sb_2O_5$ were added to 1915 parts of viscose (3% $Sb_2O_5$, 10% PVBr). The rayon produced by the procedure of this example contained 1.41% Sb and 5.37% Br. The knitted articles had an average char length of 12.6 cm.

In some instances it has been found that darkening of cellulosic films or fibers containing the flame retardant additives of the inventions occurs upon heating to 120° C. or higher for 30 minutes. Discoloration does not occur at lower temperatures or shorter times. A number of commercially available stabilizers have been found to inhibit this darkening when added to the viscose solution. Fibers which were padded with solutions of these stabilizers darkened after heating. Fibers in which the stabilizers were added to the viscose did not darken. Examples of commercially available stabilizers that effectively prevent discoloration upon heating are organotin compounds sold under the trademarks Thermolite 25, Thermolite 813, Thermolite 49 and Color Gard 424. They should be used at concentrations of from about 5 to 50%, preferably 13 to 27% based on PVBr weight (1.3 to 2.7% based on cellulose weight). The following Examples 37 and 38 illustrate the effect of stabilizer addition.

EXAMPLE 37

The procedure of Example 26 was followed except that 11.5 parts of colloidal $Sb_2O_5$ and 28.1 parts of PVBr latex were used per 1500 parts of viscose. The resultant fibers were bleached by stirring 2-3 parts of fibers with 100 parts of a solution of 3 parts $H_2O_2$ and 97 parts water. The fibers were stirred at room temperature for one hour, recovered by suction filtration and air dried. They were divided into 3 parts and each part was heated at 130° C. for either 0, 30 or 90 minutes. The fibers were white before heating and slightly darkened after 30 minutes of heating at 130° C., but had turned deep purple after heating for 90 minutes. These results are quantitatively shown in Table V.

EXAMPLE 38

The procedure of Example 37 was followed except that 3.56 parts of Thermolite 25 (based on PVBr or 2.66 parts based on 100 parts of cellulose)dissolved in 3 parts of dioxane as a diluent, was added to the viscose. The product fibers showed substantial resistance to the severe discoloration or darkening due to thermal degradation exhibited by the fibers of Example 37, as can be seen from Table V.

TABLE V

| Example | Minutes at 130° C. | Elrpho Brightness % |
|---|---|---|
| 37 (No stabilizer) | 0 | 51.6 |

TABLE V-continued

| Example | Minutes at 130° C. | Elrpho Brightness % |
|---|---|---|
|  | 30 | 32.1 |
|  | 90 | 18.1 |
| 38 (With stabilizer) | 0 | 50.2 |
|  | 30 | 41.8 |
|  | 90 | 35.6 |

The antimony oxide useful in the invention is a colloidal particle size $Sb_2O_5$ having an average particle size of the order of 15 millimicrons or slightly greater. This contrasts with normal commercially available antimony oxide which has a particle size of about 2000 millimicrons or some 100 times larger. Colloidal $Sb_2O_5$ is commercially available as a dispersion or suspension in water, in a variety of organic liquids or as an agglomerated spray dried powder. The antimony oxide used in the examples was that sold under the trademark Nyacol A-1550 and was a 50% solids content dispersion in water of 10 angstrom size $Sb_2O_5$. The poly-(vinyl bromide) used in the examples was a commercially available non-plasticized anionic emulsion of vinyl bromide based polymers in water having a pH of about 3, a solids content of 38-42%, a particle size of 0.1-0.5 microns, a specific gravity of 1.31, a viscosity of 5.0 centipoises at 25° C. and a surface tension of 28.0 dynes/cm². The $Sb_2O_5$ should be added in amounts, based on cellulose weight, of from 3 to 7%, with a preferred amount being 4 to 6%. The PVBr should be added in an amount, on the same basis, of from 5 to 30%, with from 8-25% representing a preferred quantity. About 45-60% of the antimony oxide and about 79-88% of the PVBr is retained in the products through typical viscose processes. Thus, 5% $Sb_2O_3$ will provide about 2 to 3% $Sb_2O_5$ in the finished product; 15% PVBr will provide from about 12 to over 13% PVBr in the finished product. Retention of $Sb_2O_5$ and PVBr in the products may however be increased by reducing the time of contact of the $Sb_2O_5$ and PVBr with the alkaline viscose as, for example, by in-line injection of the flame retardant so that the time of contact of the flame retardant with the alkaline viscose is limited to several minutes rather than several hours.

We claim:

1. A flame resistant cellulosic product regenerated from a cellulosic viscose solution containing from 3 to 7% by weight of colloidal $Sb_2O_5$ and from 5 to 30% by weight of polyvinyl bromide, said weights being based upon the weight of cellulose.

2. The product of claim 1 containing an organotin stabilizer.

3. The product of claim 1 in the form of a fiber.

4. The product of claim 1 in the form of a film.

5. The product of claim 1 in which the $Sb_2O_5$ has an average particle size of about 10 to 20 angstroms.

6. The product of claim 1 in which the amount of $Sb_2O_5$ is from 4 to 6% by weight.

7. The product of claim 1 in which the amount of polyvinyl bromide is from 8-25% by weight.

8. A process of producing a flame resistant regenerated cellulosic product comprising
   adding from 3-7% by weight of colloidal $Sb_2O_5$ and from 5 to 30% by weight of polyvinyl bromide, said weights being based upon the weight of cellulose, to a cellulosic viscose solution, and
   regenerating a cellulose product from said cellulosic solution.

9. The process of claim 8 in which the regenerated cellulosic product is a fiber spun from the viscose solution.

10. The process of claim 8 in which the regenerated cellulosic product is a film cast from the viscose solution.

* * * * *